United States Patent
Regnier et al.

[11] 3,864,348
[45] Feb. 4, 1975

[54] 1-OXA-3,8-DIAZA SPIRO (4,5) DECANE COMPOUNDS

[75] Inventors: Gilbert Regnier, Chatenay Malabry; Roger Canevari, Villebon/Yvette; Jean-Claude Poignant, Bures/Yvette; Jacques Duhault, Chatou, all of France

[73] Assignee: "Science Union et Cie, Societe Francaise de Recherche Medical", Suresnes, France

[22] Filed: Oct. 6, 1972

[21] Appl. No.: 295,731

[30] Foreign Application Priority Data
Oct. 29, 1971 France .................. 71.38875

[52] U.S. Cl. ........ 260/293.66, 424/267, 260/649 F, 260/293.78
[51] Int. Cl. ............................ C07d 29/36
[58] Field of Search ................ 260/293.66

[56] References Cited
UNITED STATES PATENTS
3,399,192  8/1968  Regnier et al. ............... 260/293.66
3,598,828  8/1971  Regnier et al. ............... 260/293.66

Primary Examiner—Norma S. Milestone
Assistant Examiner—S. D. Winters
Attorney, Agent, or Firm—Gordon W. Hueschen

[57] ABSTRACT 1-oxa-3,8-diaza spiro (4,5) decane compounds of the formula:

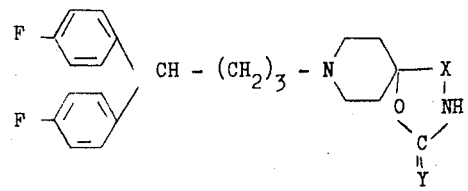

wherein X is methylene or carbonyl and Y is oxygen or sulfur. These compounds possess neuroleptic and hypotensive properties.

4 Claims, No Drawings

1-OXA-3,8-DIAZA SPIRO (4,5) DECANE COMPOUNDS

The present invention provides 1-oxa-3,8-diaza spiro (4,5) decane compounds of the general formula I:

I 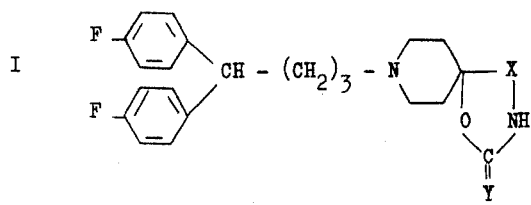

and addition salts thereof, wherein:

X is selected from the group consisting of methylene and carbonyl radicals, and

Y is selected from the group consisting of oxygen and sulfur atoms.

The compounds of the general formula I are new and are prepared by reacting a halo compound of the general formula II:

II 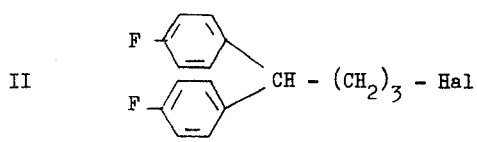

wherein Hal is selected from the group consisting of chlorine and bromine atoms, with a spiro (4,5) decane compound of the general formula III:

III 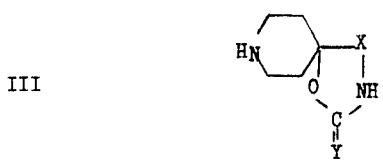

wherein X and Y have the meanings given above.

One of the most satisfactory ways of carrying out this process comprises reacting a compound of formula II with a compound of formula III, in a suitable solvent, at a temperature within the range of from 120° to 150° C, in the presence of an acceptor for the hydrohalic acid formed during the reaction. As suitable solvents, there may be mentioned for example, aliphatic alcohols having from 4 to 5 carbon atoms such, for example, as butanol and isobutanol, and tertiary aliphatic amides such, for example, as dimethylformamide and dimethylacetamide. The acceptor for hydrohalic acid may be an alkaline derivative of carbonic acid such for example, as sodium or potassium carbonate, a tertiary amine such for example, as triethylamine or pyridine or an excess of the compound of the general formula III.

Furthermore, the compounds of the general formula I wherein X represents a methylene radical and Y has the meaning given above, may also be prepared according to a process wherein an amino-alcohol of the formula IV:

IV 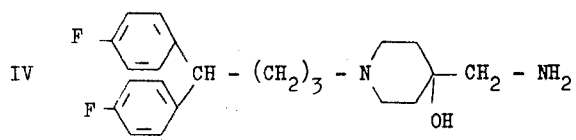

is cyclized by the means of a cyclizing agent of the general formula V:

 V wherein Y has the meaning given above and R and R' are simultaneously a chlorine atom, a methoxy radical, an ethoxy radical or an amino radical or in the case where Y represents a sulfur atom R and R' joined together, also represent a sulfur atom.

As cyclizing agents giving the best yields, there may be mentioned ethyl carbonate in the case where Y represents an oxygen atom, and carbon sulfide in the case where Y represents a sulfur atom.

In the case where Y represents an oxygen atom, one of the most advantageous method comprises heating the amino-alcohol of the formula IV in solution in a large excess of ethyl carbonate which is used as solvent, in the presence of a small quantity of an alkaline alcoholate such for example, as sodium methanolate or ethanolate used as cyclizing catalyst. The heating time depends on the boiling temperature of the reaction mixture. This temperature rises gradually as the distillation of the alcohol formed during the reaction proceeds.

In the case where Y represents a sulfur atom, one of the most satisfactory ways of carrying out this last process comprises heating the amino-alcohol of the formula IV in a mixible with water and low molecular-weight alcohol, such for example as ethanol or isopropanol, with a slight excess of carbon sulfide, in the presence or not of an alkaline hydroxide such as sodium or potassium hydroxide in equimolecular proportion. The cyclization carries on while hydrogen sulfide is given off and the completion of hydrogen sulfide release shows the end of the reaction. The thione formed during the cyclization precipitates out from the reaction mixture. In the case where the reaction is performed in the presence of an alkaline hydroxide, the thione precipitates out in the form of an alkaline salt which has to be neutralised with a dilute acid.

The compounds of the general formula I prepared by either one or the other of the above processes may be purified by physical methods such for example, as crystallisation or chromatography, or by chemical methods such for example as convertion into addition salts, crystallisation of these last in an appropriate solvent then decomposition of the so-obtained pure salts in a suitable solvent.

The compounds of the general formula I wherein Y represents an oxygen atom are weak bases which yield addition salts with strong inorganic or organic acids. As acids which may be used to form these salts, there may be especially mentioned, for example, in the inorganic series, hydrochloric, hydrobromic, sulfuric and phosphoric acids, and in the organic series, acetic, propionic, maleic, fumaric, succinic, benzoic, tartaric, malic, oxalic, methanesulfonic and isethionic acids.

The compounds of the general formula I wherein Y represents a sulfur atom are amphoteric compounds which yield addition salts with strong bases such for example as alkaline-metal hydroxides, or with strong inorganic or organic acids such for example as hydrochloric, hydrobromic, sulfuric, phosphoric, acetic, propionic, maleic, fumaric, tartaric, citric, oxalic, benzoic

EXAMPLE 1

1-oxa-2-oxo-3,8-diaza-8-(4,4-bis p.fluorophenyl butyl) spiro (4,5) decane

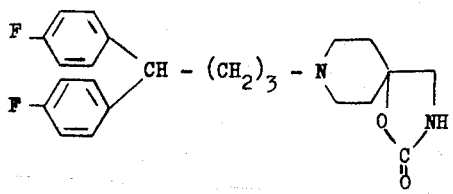

A solution of 67.5 g (0.24 mole) of 1-chloro-4,4-bis-p.fluorophenyl butane, 75 g (0.48 mole) of 1-oxa-3,8-diaza spiro (4,5) decan-2-one and 600 ml of anhydrous dimethylformamide was heated at 140° C for 2 hours. The solvent was then evaporated under vacuum and the syrupy residue was taken off with 1000 ml of water. The solution was rendered alkaline by the means of an excess of potassium carbonate and the oily suspension was stirred with 500 ml of ether. The product which crystallises was suction-filtered off and washed several times with water and with ether. There were obtained 84 g of beige crystals which recrystallized from 900 ml of ethanol gave 70.5 g of 1-oxa-2-oxo-3,8-diaza-8-(4,4-bis p.fluorophenyl butyl) spiro (4,5) decane, white crystals melting at 184°-185° C.

The following compounds were prepared according to the process described in Example 1:

a. 1-oxa-2-thioxo-3,8-diaza-8-(4,4-bis p. fluorophenyl butyl) spiro (4,5) decane, M.P. 155-156° C (ethanol), starting from 1-chloro-4,4-bis p. fluorophenyl butane and 1-oxa-3,8-diaza spiro (4,5) decane-2-thione.

b. 1-oxa-2,4-dioxo-3,8-diaza-8-(4,4-bis p. fluorophenyl butyl) spiro (4,5) decane, M.P. of the corresponding fumarate : 217°-218° C (anhydrous methanol), starting from 1-chloro-4,4-bis p. fluorophenyl butane and 1-oxa-3,8-diaza spiro (4,5) decane-2,4-dione.

EXAMPLE 2

1-oxa-2-thioxo-3,8-diaza-8-(4,4-bis p. fluorophenyl butyl) spiro (4,5) decane.

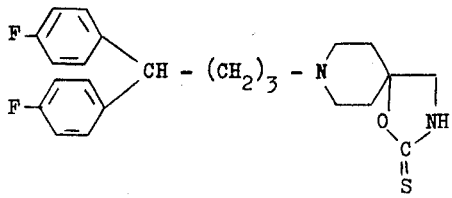

A solution of 6.3 g of potassium hydroxide in 200 ml of water, then 7.5 g (0.096 mole) of carbon sulfide were successively added to a suspension of 18 g (0.048 mole) of 1-(4,4-bis p. fluorophenyl butyl) 4-aminomethyl piperidin-4-ol. (M.P. of its fumarate : 232° C) in 300 ml of ethanol. The mixture was heated to the boiling temperature. A progressive dissolution then a precipitation of a gummy product was observed. After heating for 9 hours, when the release of $H_2S$ stops, the mixture was cooled and the unsoluble gummy product was decanted off then taken off with 250 ml of water. The product crystallized. There were obtained 19.5 g of crystals which recrystallized from 125 ml of ethanol gave 15 g of 1-oxa-2-thioxo-3,8-diaza-8-(4,4-bis p. fluorophenyl butyl) spiro (4,5) decane, white crystals melting at 155°-156° C.

1-(4,4-bis p. fluorophenyl butyl)-4-aminomethyl piperidin-4-ol, used as starting material was prepared by reduction of the corresponding cyanohydrin by the means of lithium alanate in tetrahydrofurane.

The following compound was prepared according to the process described in Example 2:

1-oxa-2-oxo-3,8-diaza-8-(4,4-bis p. fluorophenyl butyl) spiro (4,5) decane, M.P. 184°-185° C, starting from 1-(4,4-bis p. fluorophenyl butyl)-4-aminomethyl piperidin-4-ol and phosgene.

The new compounds of the invention possess valuable pharmacological and therapeutic properties, especially neuroleptic and antihypertensive properties.

The neuroleptic properties were demonstrated by the modifications observed in the rat on the stereotypy, motility, excitation, licking of the paws, and the neurovegetative symptoms (sudation, salivation, polyuria, defecation, piloerection, exophtalmus) after administration of 10 mg/kg of amphetamine I.P.

The tables given here-after, illustrate the results obtained with a compound of the invention, 1-oxa 2-thi-oxo-3,8-diaza -8-(4,4 bis p. fluorophenyl butyl) spiro (4,5) decane, or S 2657 in comparison with the untreated animals (gummy suspension). The animals received an only dose of 40 mg/kg P.O. of the compound to be tested and 30 min., 24 h, 48 h et 72 h after, the dose of 10 mg of d.amphetamine. The results are given in scores and pointed out 0–30 min., 30 min.–1 hr. and 1 hr.–2 h after the amphetamine has been administered. An important decrease of the amphetaminic stereotypy is observed and also the suppression of the excitation, licking and neurovegative symptoms. These results show a prolonged activity of the compounds of the invention, going to 72 hours after a single administration. These results were confirmed by the skinner CER test (conditioned emotional response). This test enables to create in the animal a conflicting situation. An easy programme, with variable spaces, allows the trained rat to have a reward (drop of water) in pressing a lever. The emission of a non aversive sound ending by an electric shock is superposed on this programme. The animal, connecting noise and shock, is in an anxious condition and stops working in order to avoid the punishment. In this test, the animals are treated only 1 time the first day and the measures are then effectued each day for 3 to 4 days. The results show the depressant activity of the compounds of the invention on the basic programme, without modification of the behaviour and a disappearing of the anxiety provoked by the non aversive sound. The sustained and long acting release of these compounds must be emphasized.

So, it was observed 24 hours after the administration of 5 mg/kg P.O. of the compound S 2657 a decrease of about 66 % of the activity of the rat and a decrease of an average of 50 %, 72 hours after the administration of the product.

The antihypertensive effect was studied in the anesthetized dog and it was noted a decrease of the blood pressure from 40 to 50 mm Hg after an administration of 5 mg/kg of the compounds of the invention by intravenous route.

The acute toxicity was studied in mice and the LD$_{50}$ was situated between 150 and 300 mg/kg by intraperitoneal route and between 300 and > 2000 mg/kg by oral route.

The new compounds may be used as medicines, especially as neuroleptics and hypotensives, in association with the usual pharmaceutical carriers such as distilled water, glucose, lactose, starch, talc, magnesium stearate, ethyl cellulose or cocoa butter, for oral, rectal or parenteral administration. The pharmaceutical forms may be tablets, dragees, capsules, suppositories or injectable solutions. The dose may vary from 10 to 100 mg 1 to 5 times a day.

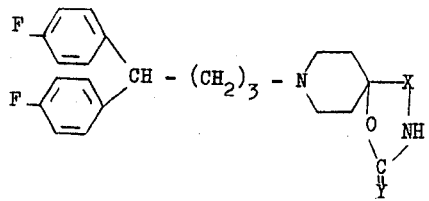

wherein:
X is selected from the group consisting of methylene and carbonyl, and
Y is selected from the group consisting of oxygen and sulfur; and B. physiologically tolerable addition salts thereof.

2. A compound of claim 1 which is 1-oxa-2-oxo-3,8-diaza-8-(4,4-bis p. fluorophenyl butyl) spiro (4,5) decane.

3. A compound of claim 1 which is 1-oxa-2-thioxo-3,8-diaza-8-(4,4-bis p. fluorophenyl butyl) spiro (4,5) decane.

4. A compound of claim 1 which is 1-oxa-2,4-dioxo-3,8-diaza-8-(4,4-bis p. fluorophenyl butyl) spiro (4,5) decane.

* * * * *

We claim:

1. A compound selected from the group consisting of:

A. 1-oxa-3,8-diaza spiro (4,5) decane compounds of the formula: